Aug. 4, 1959   L. E. SWABB, JR   2,898,290
HYDROCARBON CONVERSION PROCESS AND APPARATUS
Filed Jan. 4, 1954
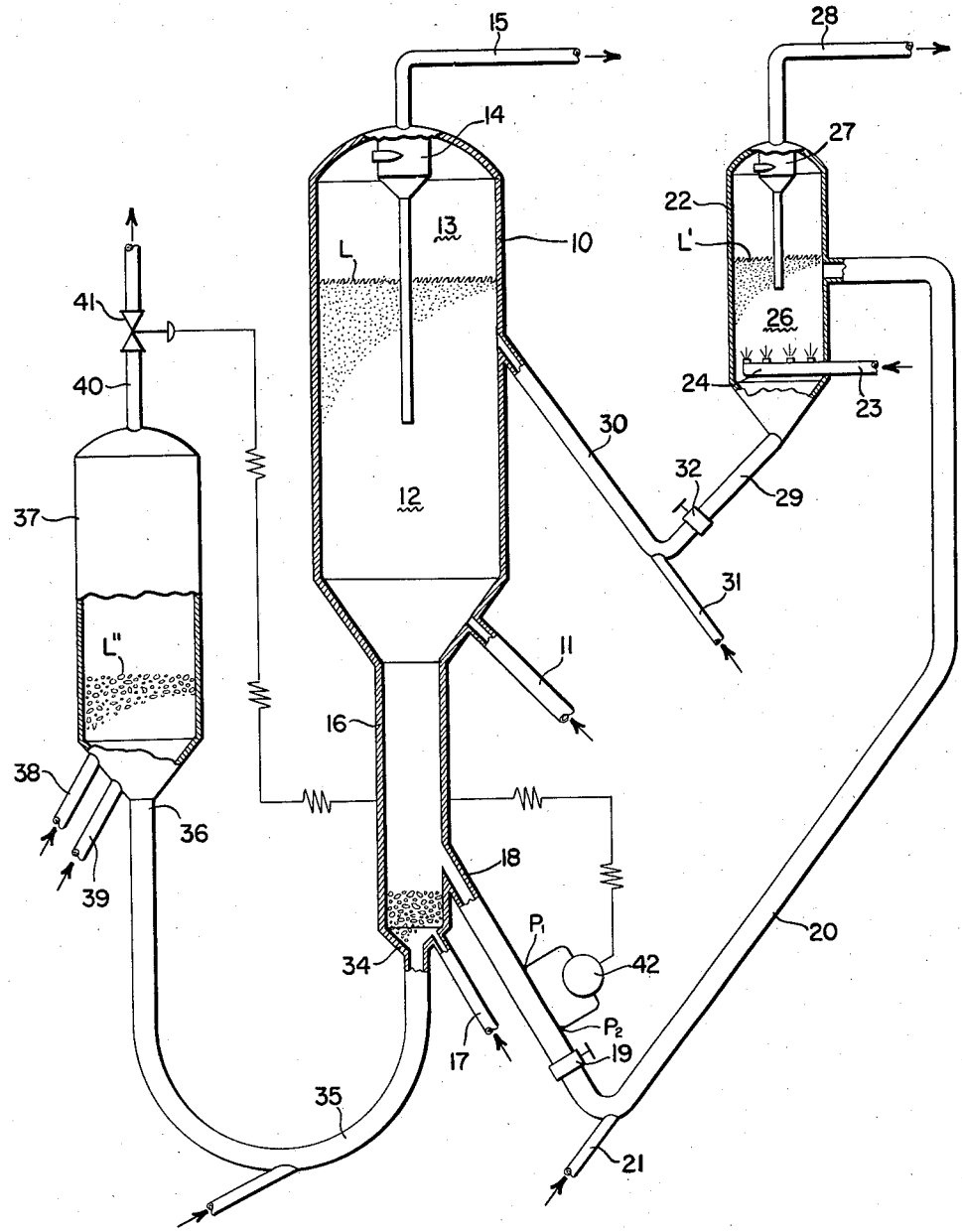
INVENTOR
Lawrence E. Swabb, Jr.
BY
ATTORNEY United States Patent Office 2,898,290
Patented Aug. 4, 1959

2,898,290

HYDROCARBON CONVERSION PROCESS AND APPARATUS

Lawrence E. Swabb, Jr., Baton Rouge, La., assignor to Esso Research and Engineering Company, a corporation of Delaware Application January 4, 1954, Serial No. 402,018

4 Claims. (Cl. 208—136)

This invention relates to the catalytic conversion of hydrocarbons and more particularly to the catalytic reforming or hydroforming of hydrocarbon fractions boiling in the motor fuel or naphtha range of low knock rating into high octane number motor fuels rich in aromatics by the fluidized solids technique.

It is known that petroleum naphthas can be subjected to a reforming treatment to yield liquid products boiling within the gasoline boiling range and possessing improved octane numbers and better engine cleanliness characteristics. A well known and widely used process for upgrading petroleum naphthas is called hydroforming. In hydroforming, the naphtha feed stock is treated at elevated pressures of from about 50 to 1000 lbs. per sq. inch and at temperatures of 750–1050° F. in the presence of a solid catalyst and hydrogen or recycle gas rich in hydrogen. A variety of reactions including dehydrogenation, paraffin and naphthene isomerization, cyclization or aromatization, hydrogenation and hydrocracking occur during hydroforming.

Catalysts that have been used in hydroforming include metals such as platinum or palladium and oxides and sulfides of certain metals, particularly molybdenum, chromium, vanadium and tungsten. These catalysts are usually supported on a base or spacing agent, preferably on an adsorptive or high surface area alumina-containing composition such as various activated aluminas, alumina gel, zinc aluminate spinel and the like.

It has been proposed to effect the hydroforming of naphtha fractions in a fluidized solids reactor system in which the naphtha vapors are passed continuously through a dense fluidized bed of finely divided hydroforming catalyst particles in a reaction zone, spent catalyst being withdrawn continuously from the dense bed in the reaction zone and passed to a separate regeneration zone where inactivating carbonaceous deposits are removed by combustion whereupon the regenerated catalyst particles are returned to the main reactor vessel or hydroforming reaction zone. Fluid hydroforming as thus conducted has several fundamental advantages over fixed bed hydroforming such as (1) the operations are continuous, (2) the vessels can be designed for single rather than dual functions, (3) the reactor temperature is substantially constant throughout the reactor dense bed, and (4) the regeneration or reconditioning of the catalyst may be readily controlled to maintain catalyst activity and selectivity at a relatively constant level rather than fluctuating over a relatively wide range.

Difficulty has been encountered in achieving a heat balanced operation in fluid hydroforming. Because of selectivity considerations, low catalyst to oil ratios must be maintained in the hydroforming reaction zone and this low catalyst to oil ratio limits the amount of heat that can be transferred to the reaction zone by the catalyst. Since the amount of heat released in the regenerator is so great that the catalyst is incapable of transferring it to the reaction zone at the low catalyst to oil ratios used, it is common practice to arrange cooling coils in the regenerator to remove heat over and above that which can be safely transferred to the reactor by the catalyst. It is, therefore, necessary to supplement the heat supplied by the catalyst and this is done by preheating the feed stock and recycle or hydrogen-rich process gas to temperatures well above the average reactor temperature. This preheating has an adverse effect upon the yield of liquid products since it brings about thermal degradation of the feed as well as the higher molecular weight constituents of the recycle gas. Moreover, excessively large amounts of recycle gas must be introduced to carry heat into the reaction zone. The cost of installing and operating this extra compressor and heat exchange capacity adds very substantially to the total plant costs.

It has been proposed to overcome this heat transfer problem by circulating inert, heat-transfer solids or shot between the reactor and regenerator for absorbing heat in the regenerator and carrying that heat into the reaction zone. It would be a relatively simple matter, of course, to add inert solids to the catalyst and circulate a homogeneous mixture between the reactor and regenerator. However, this would not be practicable because the use of about 3 to 5 parts of heat transfer solids per part of catalyst would require a reduction in hydrocarbon feed rate to the reactor to one fourth or less because valuable reactor space is occupied by inert heat transfer solids rather than by catalyst.

It is the object of this invention to provide the art with an improved method and apparatus for reforming hydrocarbon fractions by the fluidized solids technique.

It is also the object of this invention to provide the art with a simple, economical, fluidized solids reactor system in which inert heat transfer solids are circulated between the reaction zone and the regeneration zone.

It is a further object of this invention to provide a fluidized solids reactor system in which inert heat transfer solids are circulated between the reaction zone and the regeneration zone and in which the weight ratio of shot to catalyst in the circulating fluid solids stream is easily controlled.

These and other objects will appear more clearly from the detailed specification and claims which follow.

In accordance with the present invention, inert, heat transfer solids such as mullite, zirconia or an inactive metal ranging from 100–800 microns in diameter are circulated with the catalyst to assist in the transfer of heat from the regenerator to the reactor. Because of the fact that the shot particles or heat transfer solids have larger diameters and are usually of higher density than the catalyst, the shot particles settle through the dense fluidized bed of catalyst in the reactor. By swaging down the bottom of the reactor vessel to form an appendage or settling zone of reduced cross section as compared with the main reactor and introducing gas at the lower portion of this settling zone, it is possible to withdraw a solids stream from this settling zone having the desired ratio of shot to catalyst for circulation to the regeneration zone and still maintain a low ratio of shot or heat transfer solids to catalyst in the main reaction zone. The weight ratio of shot to catalyst in this solids stream is so determined as to keep the reactor-regenerator system in heat balance. While variation in the rate at which gas is supplied to the lower portion of the settling zone gives a very small amount of control on the composition of the circulating solids stream, this control is inadequate to take care of emergencies that arise in or to give adequate flexibility to the operation of the system.

A way has now been found whereby the weight ratio of shot to catalyst in the circulating solids stream can be controlled very closely and rapidly. In accordance with this invention, an extra volume of shot is provided below the circulating solid stream draw-off from the settling zone. This volume is connected to a shot storage hopper by suitable lines which permit easy transfer of shot from the hopper to the settling zone and vice versa. The shot storage hopper is of such size that it can hold the entire shot inventory in the reactor-regenerator system plus an additional amount to maintain a shot level in the settling zone and in the storage hopper. Under normal operating conditions, the pressure on the shot hopper is adjusted so that a shot-catalyst interface is maintained at or near the circulating solids stream draw-off on the settling zone.

Since the fluid density of a shot-catalyst mixture is a measure of the concentration of shot in that mixture, means are provided on the standpipe used to transfer the circulating solids stream to the regenerator for measuring the density of the stream by determining the difference in pressure between two spaced points on the standpipe. This measurement or $\Delta P$ is then used in turn to control the pressure on the shot hopper by actuating a pressure control valve on the effluent gas line. If the $\Delta P$ decreases, indicating a lower shot concentration in the circulating solids stream, the pressure on the shot hopper is increased forcing shot to move from the hopper into the settling zone and thence into the solids draw-off thereby maintaining the desired shot concentration in the circulating solids stream. Similarly, if the $\Delta P$ increases, indicating an increase in shot concentration in the circulating solids stream, the pressure on the shot hopper is decreased forcing shot to move from the settling zone into the transfer line and thence into the shot storage hopper and thereby decreasing the shot concentration in the circulating solids stream.

A particular advantage of this invention is its ability to handle severe upsets in the reactor-regenerator system. For example, suppose the solids circulation between the reactor and regenerator is stopped. In this event, the shot would continue to settle through the dense bed in the reactor and if the circulation is stopped long enough, the entire settling zone as well as the bottom of the reactor would become filled with shot. Subsequent resumption of solids circulation would result in poor distribution of shot in the system for an extended period of time. However, with the present invention if such a stoppage should occur the shot could be withdrawn from the settling zone into the shot storage hopper. When circulation is again established, the shot can be introduced into the settling zone and thence into the circulating solids stream at the desired rate and the system brought under control immediately.

Reference is made to the accompanying drawing illustrating a diagrammatic flow plan of a system in accordance with the present invention.

Referring to the drawing, the system comprises a reactor vessel 10, a regenerator vessel 22 and a shot or inert heat transfer solids storage hopper 37, suitably connected together for circulation of solids as will be described below. Feed stock or a petroleum naphtha fraction and hydrogen-rich gas suitably preheated are supplied through line 11 to the lower part of the reactor vessel. Although a single inlet line for the naphtha and the hydrogen-rich gas is shown, it will be understood that separate inlet lines may be provided for these materials and if introduced separately they may be introduced at the same or different levels in the reactor, it being generally preferred to introduce the naphtha at a higher level than the hydrogen-rich or recycle gas. It will also be understood that suitable means such as nozzles, distributor rings, inlet cones or grids may be arranged within the vessel in order to effect uniform distribution of the reactants over the cross section of the vessel.

The reactor vessel 10 is charged with finely divided catalyst particles and with inert heat transfer solids or shot which are maintained as a dense, fluidized liquid simulating mass or bed 12 having a definite level L or interface separating the dense, fluidized bed 12 from a disperse or dilute phase 13 in the upper part of the reactor comprising small amounts of solid particles entrained in the vaporous reaction products. The reaction products pass overhead from the reactor dense bed 12 and are passed through a cyclone separator 14 or the like in order to free them of most of the solid particles that are entrained therewith. The separated solid particles are returned to the reactor dense bed through the dip leg attached to the bottom of the cyclone separator 14. Reaction products substantially free of catalyst or other solid particles are removed through product outlet line 15 to suitable product recovery, stabilizing and/or storage equipment.

Suitable catalysts for charging to the reactor vessel 10 are precious metals such as platinum, palladium and the like or oxides or sulfides of metals such as molybdenum, chromium, vanadium, tungsten or the like or mixtures thereof upon a carrier such as activated alumina, alumina gel, zinc aluminate spinel or the like. Preferred catalysts contain from about 0.01 to 2.0 wt. percent platinum upon alumina, preferably alumina produced by the hydrolysis of an aluminum alcoholate, or from 5 to 15 wt. percent of molybdic oxide or from about 10 to 40 wt. percent chromic oxide upon an adsorptive alumina or zinc aluminate spinel. If desired, minor amounts of stabilizers and promoters such as silica, calcium oxide, ceria, potassia, zirconia or the like can be included in the catalyst. The catalyst particles should, for proper fluidization, be between about 80 and 400 mesh in size, or about 0–200 microns in diameter with a major proportion between about 20 and 100 microns.

The inert heat transfer solids or shot are preferably coarser and/or of greater density than the catalyst used in the process. Suitable materials for use as inert, heat transfer solids are corundum, mullite, fused alumina, fused silica or an inert or substantially inert metal such as iron, stainless steel of Monel. It is necessary that the heat transfer solids have no adverse effects upon the catalytic reaction or hydroforming process and that they be stable or resistant to breakdown due to the temperature and the mechanical action to which they are subjected in the process. The size of the inert heat transfer solids or shot is of critical importance and must be determined by the proportions of the catalyst bed and the desired operating conditions for the system. The heat transfer solids may vary from 100 to 800 microns in diameter and are preferably about 300–500 microns in diameter and are preferably in the form of spherical or spheroidal particles. The inert heat transfer solids are of as large diameter and density as may be used and still obtain proper fluidization particularly in the transfer lines.

Vapor velocities in the reactor are such as to permit the inert heat transfer solids to move downwardly through the dense fluidized bed in the reactor past the naphtha feed and recycle gas inlet and distributing means into the shot elutriating or settling zone or vessel 16 connected to the bottom of reactor vessel 10. The shot elutriating or settling vessel 16 is substantially smaller in cross-sectional area than the main reactor vessel 10. For example the diameter of the section 16 should be less than about one-half the diameter of the main reactor vessel. An inlet line 17 is connected to the bottom of the shot elutriating or settling zone 16 in order to supply hydrogen-rich gas or recycle gas thereto. The velocity of the recycle gas through section 16 should be sufficiently low to avoid interfering with the settling of shot through that section but still high enough to strip off entrained or adsorbed hydrocarbons. A draw-off line 18 for the circulating solid particles stream is connected to the section 16 near its lower end. The draw-off line is extended downwardly either vertically or at a relatively steep angle (less than 45° to the vertical) for a sufficient distance to form a standpipe for developing sufficient fluistatic pressure in the circulating solids stream to facilitate the transfer of said solids to the regenerator. A slide valve 19 or the like is preferably arranged near the bottom of the standpipe or line 18 in order to control the discharge of solids therefrom. The solids stream is discharged from the base of standpipe line 18 into riser line 20. Lift gas, preferably the air or a portion of the air required for regeneration is supplied to riser line 20 through inlet line 21 in order to reduce the density in riser 20 sufficiently so that the circulating solids will flow upwardly therethrough in the regenerator vessel 22. It is preferred to operate with low velocities in order to minimize attrition in the riser line.

Air or regeneration gas is supplied through line 23 to suitable distribution means such as a ring or spider 24 arranged in the bottom of regenerator 22. Carbonaceous deposits are burned off the catalyst particles during their passage through riser line 20 and while in the regenerator vessel 22. Gas velocities through regenerator vessel 22 may be sufficient to form a dense, homogenous mixture or bed 26 of catalyst and shot or heat transfer solids having a level L′ or may be controlled to permit settling and withdrawal of the shot at a more rapid rate than the catalyst. Off gases or combustion products pass overhead from dense bed 26 and are passed through cyclone separator 27 or the like for the separation or recovery of entrained solids which are returned to the dense bed through the dip leg attached to the cyclone separator. The gases, substantially free of entrained solid particles pass from the cyclone separator 27 into outlet line 28 to a waste gas stack or flue or to suitable scrubbing and storage equipment in the event that it is desired to use this gas for stripping or transport purposes in the process. Although the regenerator is shown as a separate vessel, riser line 20 can serve as a transfer line burner type of regenerator by supplying all the air necessary for regeneration at 21 and providing for adequate residence time for the solids in line 20 to complete the regeneration. This does not present any particular difficulties because combustion occurs very rapidly because of the nature of the catalyst and the high oxygen partial pressure at the elevated pressures maintained in the system. If riser line 20 serves as the regeneration zone, the vessel into which the line discharges may be merely a cyclone separator since it serves only to disengage the solid particles from the regeneration gases.

The mixture of hot, inert heat transfer solids or shot and hot, freshly regenerated catalyst passes downwardly from regenerator vessel 22 into the downflow leg 29 and thence into upflow leg 30 of a V-bend or U-bend transfer line and finally back into the reactor vessel. Lift gas which may be an inert gas or which may contain hydrogen may be introduced into upflow leg 30 in order to assist the flow of solids. A slide valve 32 may also be provided in the transfer line in order to control solids flow and/or serve as a safety valve to prevent flare backs in the system. With a V-bend or U-bend type transfer line as illustrated it is advisable to have the outlet end of the line near the upper part of the dense bed 12 in the reactor in order to minimize the back pressure that must be overcome by the bed level in the regenerator. It is also desirable, of course, to introduce the hot mixture of heat transfer solids and regenerated catalyst near the upper part of the reactor dense bed in order that the heat transfer solids will traverse a major part of the depth of the bed. There may be a further advantage in introducing the hot solids and catalyst near the top of the dense bed in that it may form a region of slightly higher temperature which may be helpful in converting some of the more refractory constituents in the reaction mixture just before they leave the reactor dense bed.

A layer consisting essentially of inert heat transfer solid or shot fills the lower end of the shot elutriating or settling section 16 and has an interface or boundary between the shot and the shot-catalyst mixture substantially at the entrance to the circulating solids draw-off 18. The bottom of section 16 is connected at 34 to a transfer line 35 which may conveniently be in the form of a U-bend with the other end 36 connected to the heat transfer solid or shot storage hopper 37. The hopper 37 is of adequate capacity to hold the entire shot inventory of the system plus some extra shot for smoothing out the operation and/or giving some flexibility by increasing the total shot inventory in the reactor-regenerator system. As shown, with the system in operation, the extra shot held in the storage hopper 37 is at the level L″. Air, steam or an inert gas is supplied to the storage hopper through line 38. A second inlet line 39 is also provided at the bottom of hopper 37 for supplying fuel for preheating the shot during start-up of the unit. Gases pass overhead from hopper 37 through outlet line 40 and pressure control valve 41. Closing of control valve 41 serves to increase pressure in hopper 37 which in turn forces the level of the inert heat transfer solids downwardly causing the passage of shot from hopper 37 through transfer line 35 into section 16 thereby raising the level of the shot-catalyst and shot mixture interface and forcing shot into the draw-off line 18 thereby increasing the concentration of shot in the circulating solids stream and increasing the shot inventory in the reactor-regenerator system. Opening of the valve 41 lowers the pressure in hopper 37 permitting the level of the shot in the hopper to rise permitting the withdrawal of shot from the bottom of settling section 16 and thus lowering the shot inventory in the reactor-regenerator system.

Since the density of the shot-catalyst mixture is a measure of the ratio of shot to catalyst in the mixture, advantage is taken of this fact to provide an automatic control on the shot circulation. A meter 42 is provided for measuring the difference in pressure between $P_1$ and $P_2$ on the line 18 through which the mixture of shot and catalyst passes, a decrease in the $\Delta P$ or pressure difference between $P_1$ and $P_2$ indicates a lower concentration of shot in the mixture while an increase in the $\Delta P$ indicates an increase or higher concentaration of shot in the mixture. Automatic control means are provided on valve 41 which control means is actuated by the $\Delta P$ meter 42 to open valve 41 when the $\Delta P$ increases thereby withdrawing shot from the reactor-regenerator system into the storage hopper 37 and to close valve 41 when the $\Delta P$ decreases thereby forcing additional shot from the storage hopper into the settling zone 16 and thence into the reactor-regenerator system.

The feed or charging stock to the hydroforming reactor 10 may be a virgin naphtha, a cracked naphtha, a Fischer-Tropsch naphtha or the like having a boiling range of from about 125° to 450° F. or it may be a narrow boiling cut from within this range. The feed stock is preheated alone or in admixture with recycle gas to reaction temperature or the maximum temperature possible while avoiding thermal digeradation of the feed stock. Ordinarily preheating of the feed stock is carried out at about 800–1000° F., preferably about 950° F.

Recycle gas which contains 50 volume percent or more of hydrogen is preheated to temperatures of about 1000–1200° F., in suitable preheat coils. Recycle gas is circulated through the reaction zone at a rate of from about 500 to 8000 cu. ft. per barrel of naphtha feed.

The hydroforming reactor vessel is operated at temperatures between about 850 and 1050° F., preferably at about 900–950° F., and at pressures of about 50–1000 lbs./sq. inch preferably about 200 lbs./sq. inch. A small water partial pressure (approximately 0.1 to about 10 mol percent) is maintained in the reaction zone due principally to water in the feed and in the recycle gas and also due to the formation of water in the regeneration as well as in the pretreatment or reduction of the regenerated catalyst. This small water partial pressure permits operation at somewhat higher temperatures without loss in selectivity than is possible in systems lacking this water partial pressure.

The regenerator is operated at essentially the same pressure as the hydroforming reactor vessel and at temperatures of about 1000–1200° F., or low enough to avoid any danger of thermally degrading the catalyst. The average residence time of the catalyst in the reactor is of the order of from about 3 to 4 hours while the average residence time of the catalyst in the regenerator is of the order of from 3 to 15 minutes. The average residence time of the heat transfer solids or shot in the reaction zone is of the order of from about 10 minutes to one hour and in the regenerator it may be about 3 to 15 minutes, i.e., coextensive with the residence of the catalyst in the regenerator or it may have a shorter residence time as when gas velocities through the regenerator are low enough to permit settling of the shot more rapidly than the catalyst.

The weight ratio of catalyst to oil introduced into the reactor should ordinarily be about 0.5 to about 3.5 although catalyst to oil ratios of 0.1 and less may be used with platinum catalysts. It is ordinarily preferable to operate at catalyst to oil ratios of about 1.0 since higher ratios tend to give higher or excessive carbon or coke formation. Somewhat higher ratios can be used at higher pressures.

Space velocities or the weight in pounds of feed charged per hour per pound of catalyst in the reactor depends upon the age or activity level of the catalyst, the character of the feed stock and the desired octane number of the product. Space velocity for a molybdic oxide on alumina gel catalyst may vary, for example, from about 1.5 w./h./w. to about 0.15 w./h./w.

The foregoing description contains a limited number of embodiments of the present invention. It will be understood, however, that this invention is not limited thereto since numerous variations are possible without departing from the scope of this invention.

What is claimed is:

1. In a method of reforming hydrocarbon fractions boiling within the naphtha range in contact with a mixture of a major proportion of finely divided hydroforming catalyst particles and a minor proportion of inert heat transfer solid particles or shot in a dense, fluidized bed, the improvement which comprises controlling gas velocities through the bed so that the shot passes downwardly through the dense, fluidized bed, collecting the shot in a settling zone beneath the dense fluidized bed, passing recycle gas through the settling zone to control the composition of a stream of solids withdrawn from the settling zone for circulation to the regeneration zone so that the withdrawn stream will contain a major proportion of shot and a minor proportion of catalyst, circulating said stream to a regeneration zone, burning carbonaceous deposits from the circulating solids and returning the freshly regenerated catalyst and hot shot to the reaction zone, maintaining a separate reservoir of shot in communication with the settling zone, measuring the ratio of shot to catalyst in the circulation stream passing from the settling zone to the regenerating zone, adjusting the pressure in the reservoir in accordance with the measured ratio of shot and catalyst, and thereby maintaining a constant ratio of shot to catalyst by forcing shot from the reservoir to the settling zone by an increase in pressure and withdrawing shot from the settling zone to the reservoir by a decrease in pressure.

2. The process as defined in claim 1 in which the catalyst is a group VI metal oxide dispersed upon an alumina-containing support.

3. The process as defined in claim 1 in which the catalyst is a platinum metal dispersed upon an alumina-containing support.

4. In a shot-catalyst reforming system comprising a reactor vessel, a regenerator vessel and a shot reservoir, the improvement comprising a settling zone of smaller cross-sectional area than the reactor vessel arranged below and in open communication with the bottom of the reactor vessel, an inlet for gas at the bottom of said settling vessel, an outlet line for the withdrawal of shot and catalyst from the settling zone connected to the regenerator vessel, a transfer line connecting the bottom of the settling zone with the shot reservoir, a measuring means for determining the shot-catalyst ratio of the shot-catalyst stream passing from the settling zone to the regenerator vessel, and a pressure control means in the shot reservoir actuated by the measuring means whereby a constant shot-catalyst ratio is maintained by forcing shot from the shot reservoir to the settling zone by increasing the pressure and withdrawing shot from the settling zone to the shot reservoir by decreasing the pressure.

References Cited in the file of this patent

UNITED STATES PATENTS

| | | |
|---|---|---|
| 2,446,247 | Scheineman | Aug. 3, 1948 |
| 2,458,866 | Martin | Jan. 11, 1949 |
| 2,602,019 | Odell | July 1, 1952 |
| 2,643,216 | Findlay | June 23, 1953 |
| 2,663,676 | Cardwell et al. | Dec. 22, 1953 |
| 2,756,189 | Scharmann et al. | July 24, 1956 |
| 2,763,596 | Feldbauer et al. | Sept. 18, 1956 |
| 2,763,597 | Martin et al. | Sept. 18, 1956 |